(12) United States Patent
Kuribayashi et al.

(10) Patent No.: US 7,142,498 B2
(45) Date of Patent: Nov. 28, 2006

(54) RECORDED INFORMATION REPRODUCING APPARATUS

(75) Inventors: Hiroki Kuribayashi, Tsurugashima (JP); Takuma Yanagisawa, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 533 days.

(21) Appl. No.: 10/440,376

(22) Filed: May 19, 2003

(65) Prior Publication Data
US 2003/0223330 A1 Dec. 4, 2003

(30) Foreign Application Priority Data
May 29, 2002 (JP) .............................. 2002-155088

(51) Int. Cl.
*G11B 7/00* (2006.01)
(52) U.S. Cl. ........................... 369/124.03; 369/124.12; 369/47.17

(58) Field of Classification Search ..................... None
See application file for complete search history.

(56) References Cited

U.S. PATENT DOCUMENTS

| | | | |
|---|---|---|---|
| 5,835,469 A * | 11/1998 | Maeda et al. ................ | 369/100 |
| 5,850,415 A * | 12/1998 | Hunsinger et al. .......... | 375/216 |
| 6,246,640 B1 * | 6/2001 | Shimazaki et al. ......... | 369/13.1 |
| 6,377,640 B1 * | 4/2002 | Trans .......................... | 375/354 |
| 6,594,210 B1 * | 7/2003 | Kumagai .................. | 369/47.17 |
| 6,888,787 B1 * | 5/2005 | Saitoh et al. .......... | 369/112.01 |

* cited by examiner

*Primary Examiner*—Thang V. Tran
*Assistant Examiner*—Adam R. Giesy
(74) *Attorney, Agent, or Firm*—Drinker Biddle & Reath LLP

(57) ABSTRACT

It is an object to provide a recorded information reproducing apparatus that allows to eliminate crosstalk from an adjacent track correctly, even from a recording medium having both a recorded area in which information data are recorded and an unrecorded area. In order to detect a crosstalk component from an adjacent track based on a correlation between a main read signal read from a main track and a sub read signal read from an adjacent track, the relative phase between the sub read signal and the main read signal is shifted.

5 Claims, 11 Drawing Sheets

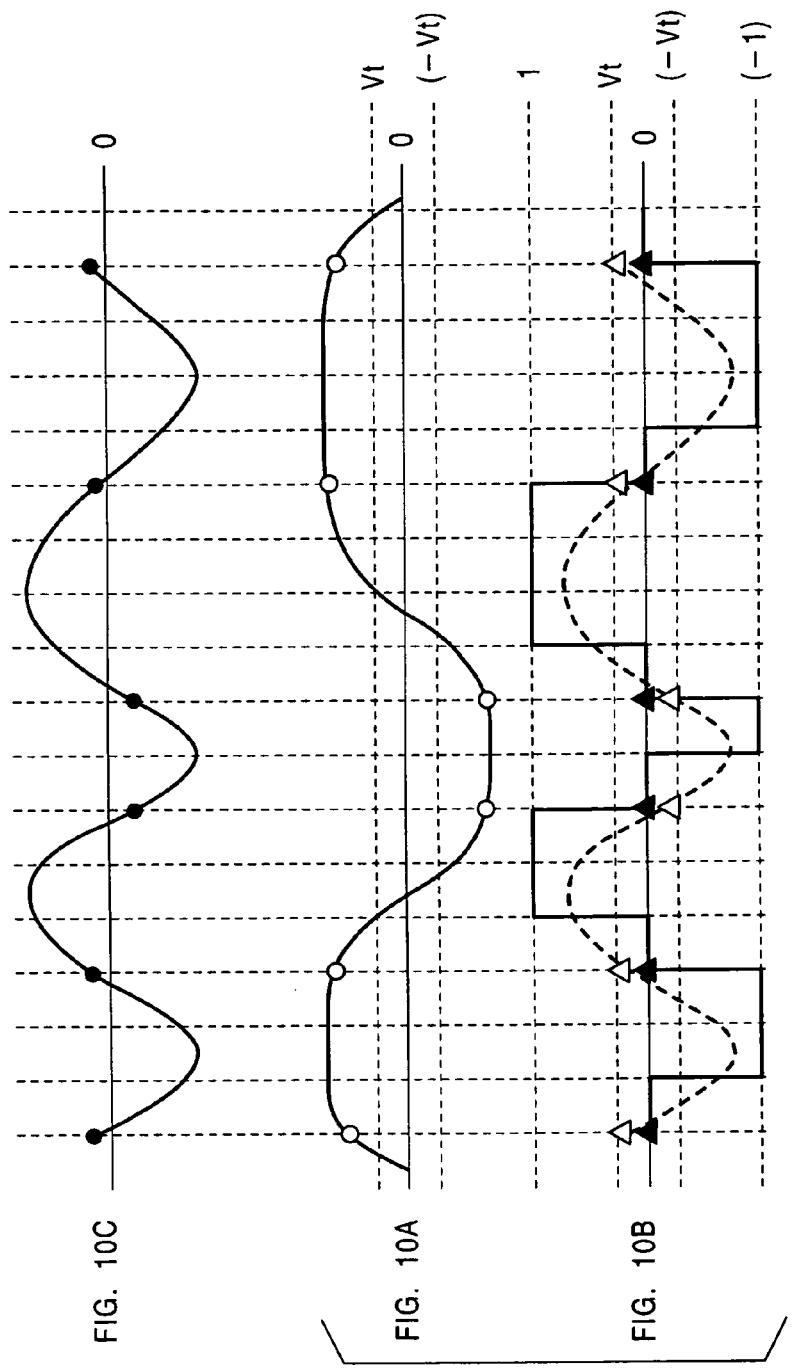

RECORDED INFORMATION REPRODUCING APPARATUS

BACKGROUND OF THE INVENTION

1. Field of the Invention

The present invention relates to a recorded information reproducing apparatus for reproducing recorded information from a recording medium.

2. Description of the Related Art

In order to read recorded information with high accuracy from a recording medium on which information is recorded with high density, it is necessary to eliminate the influence of crosstalk from a track or tracks adjacent to a track that is being read.

In order to eliminate the crosstalk, first, the recorded information is read from the track that is to be read (hereinafter, referred to as "main track") as well as from the track or the tracks adjacent to one side or both sides of the main track (hereinafter, referred to as "sub track") simultaneously, and respective read signals are obtained. Next, in accordance with a level correlation between the read signal read from the main track (hereinafter, referred to as "main read signal") and the read signal read from the sub track (hereinafter, referred to as "sub read signal"), a crosstalk component from the adjacent track is detected. Then, a read signal, from which the crosstalk has been eliminated, is obtained by subtracting this crosstalk component from the main read signal.

Here, if the recording medium that is to be reproduced is, for example, a writable disc such as a CD-R, CD-RW, DVD-R, or DVD-RW, a recorded area in which information data are written and an unrecorded area may coexist on the disc. Thus, when a pickup is tracing the outermost circumference (or innermost circumference) in the recorded area, a sub track may be located in the unrecorded area. In this case, no information data are recorded in the sub track, so that a correlation between the main read signal read from the main track and the sub read signal read from the sub track cannot be detected. Further, if no information data are recorded in the sub track, due to the influence of a tiny main read signal component leaked into the sub read signal, the correlation between the main read signal and the sub read signal becomes high. That is to say, an autocorrelation is performed due to the leakage from the main track into the sub track, so that a high correlation is detected despite the fact that this is not a situation in which the correlation is high. Therefore, there has been the problem that crosstalk is eliminated erroneously due to the crosstalk detection affected by this autocorrelation.

OBJECTS AND SUMMARY OF THE INVENTION

The present invention was devised to solve the above problems, and its object is to provide a recorded information reproducing apparatus that allows to eliminate crosstalk from adjacent tracks correctly, even from a recording medium having both a recorded area in which information data are recorded and an unrecorded area.

The recorded information reproducing apparatus according to a first aspect of the present invention is a recorded information reproducing apparatus for reproducing recorded information recorded on a recording medium, comprising: a main read portion for generating a main read signal based on amount of light that is reflected when irradiating main read beam light onto a recording track on said recording medium; a sub read portion for generating a sub read signal based on amount of light that is reflected when irradiating sub read beam light onto a position near the recording track onto which the main read beam light has been irradiated; a crosstalk detection portion for detecting a crosstalk component from an adjacent track that is superimposed on the main read signal, based on a level correlation between the main read signal and the sub read signal; and a subtraction portion for subtracting the crosstalk component from the main read signal to generate a read signal in which the crosstalk has been eliminated; wherein the crosstalk detection portion comprises a phase shift portion for shifting a relative phase between the sub read signal and the main read signal, and the crosstalk component is detected based on a level correlation between the sub read signal and the main read signal whose relative phase have been shifted by the phase shift portion.

The recorded information reproducing apparatus according to a second aspect of the present invention is a recorded information reproducing apparatus for reproducing recorded information recorded on a recording medium, comprising: a main read portion for generating a main read signal based on amount of light that is reflected when irradiating main read beam light onto a recording track on the recording medium; a sub read portion for generating a sub read signal based on amount of light that is reflected when irradiating sub read beam light onto a position near the recording track onto which the main read beam light has been irradiated; a crosstalk detection portion for detecting a crosstalk component from an adjacent track that is superimposed on the main read signal, based on a level correlation between the main read signal and the sub read signal; and a subtraction portion for subtracting the crosstalk component from the main read signal to generate a read signal in which the crosstalk has been eliminated; wherein the crosstalk detection portion comprises a correlation offset portion for subtracting a predetermined offset value from the correlation value.

The recorded information reproducing apparatus according to a third aspect of the present invention is a recorded information reproducing apparatus for reproducing recorded information recorded on a recording medium, comprising: a main read portion for generating a main read signal based on amount of light that is reflected when irradiating main read beam light onto a recording track on said recording medium; a sub read portion for generating a sub read signal based on amount of light that is reflected when irradiating sub read beam light onto a position near the recording track onto which the main read beam light has been irradiated; a crosstalk detection portion for detecting a crosstalk component from an adjacent track that is superimposed on the main read signal, based on a level correlation between the main read signal and the sub read signal; and a subtraction portion for subtracting the crosstalk component from the main read signal to generate a read signal in which the crosstalk has been eliminated; wherein the crosstalk detection portion comprises a level conversion portion for lowering a level of the sub read signal when an absolute value of the sub read signal is smaller than a predetermined value, and the crosstalk component is detected based on a level correlation between the main read signal and the sub read signal whose level has been converted by the level conversion portion.

DETAILED DESCRIPTION OF THE PREFERRED EMBODIMENT

Hereinafter, the present invention will be described by way of examples.

Figure 1:
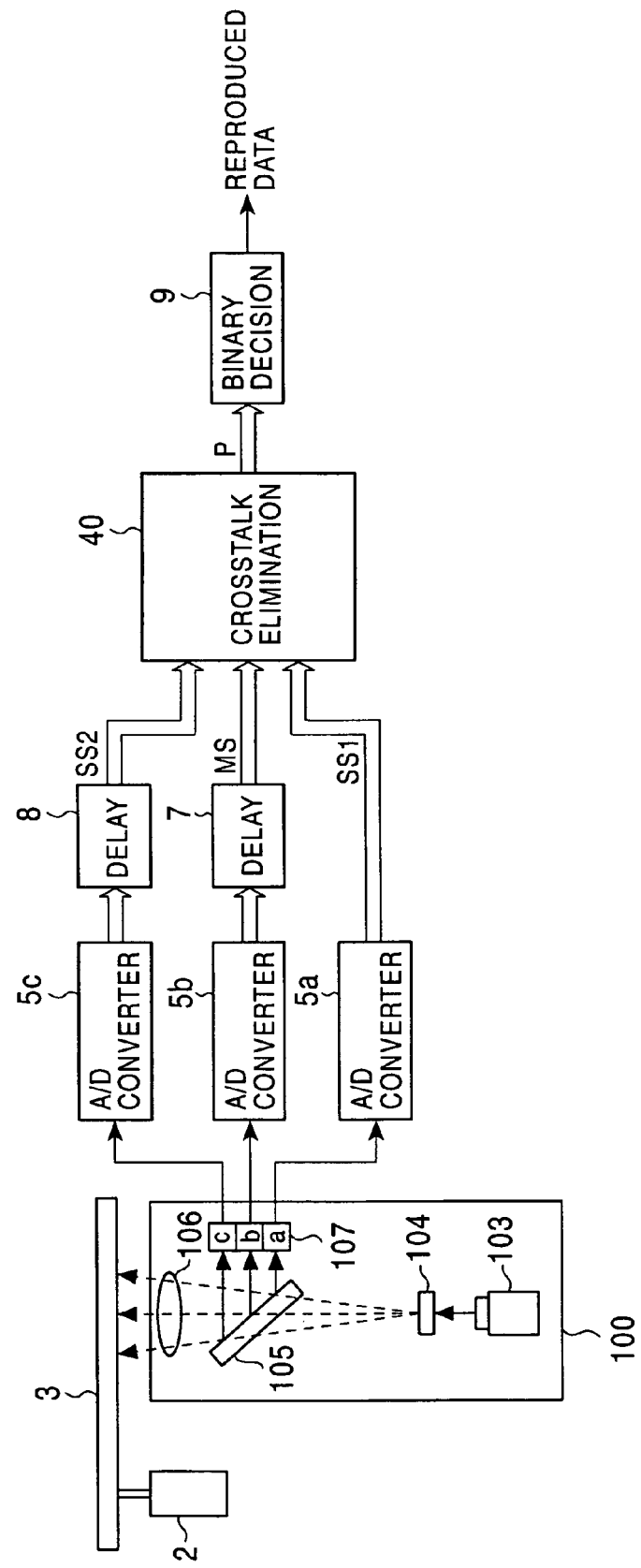
FIG. 1 is a diagram showing the configuration of a recorded information reproducing apparatus according to the present invention.

FIG. 1 is a diagram showing the configuration of a recorded information reproducing apparatus having a crosstalk elimination circuit according to the present invention.

In FIG. 1, a laser beam emanated from a laser oscillator 103, which is mounted on a pickup 100 serving as an information read portion, is split into a main read beam and two sub read beams by a grating 104. These three read beams are irradiated onto a recording disc 3 via a half mirror 105 and an objective lens 106.

Figure 2:
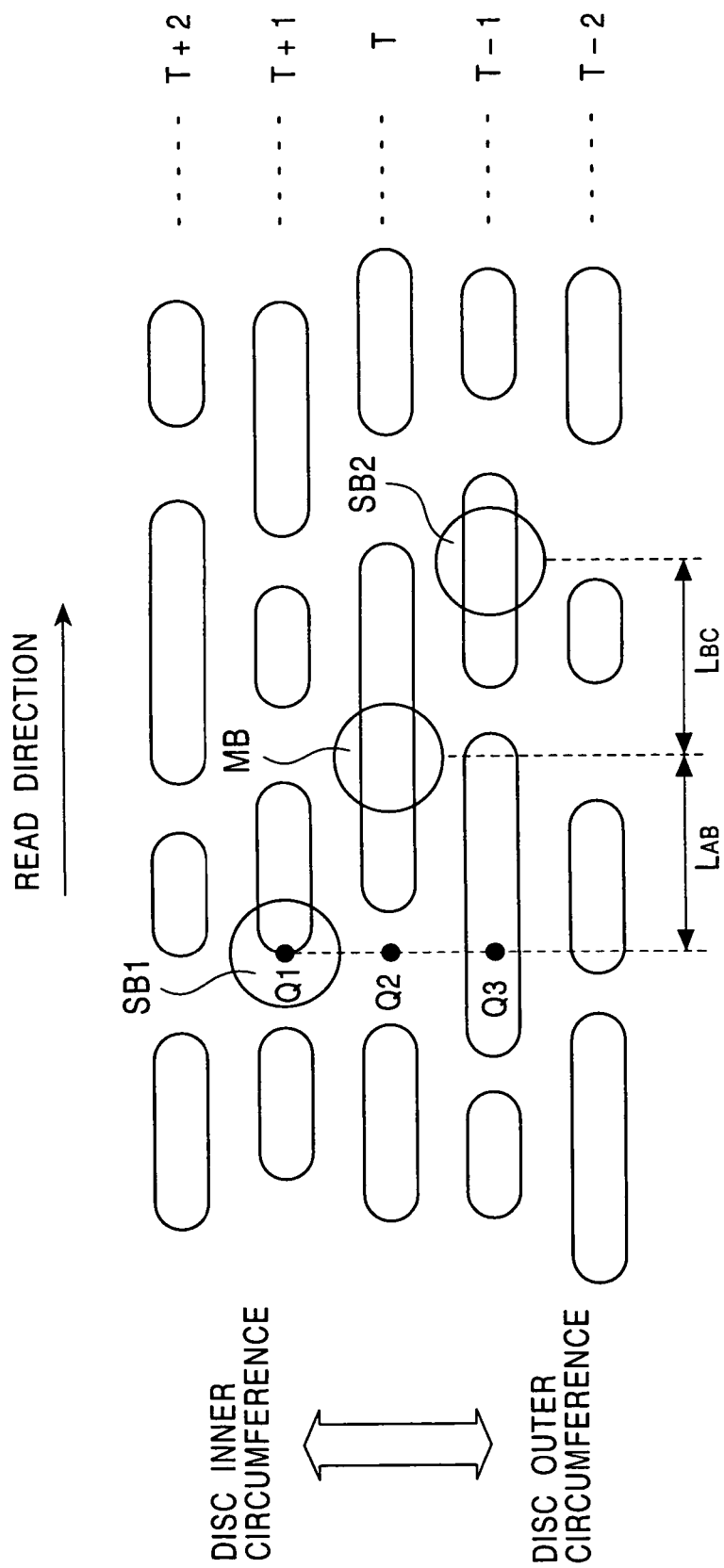
FIG. 2 is a diagram showing-the positional relationship between beam spots irradiated onto a recording disc 3 by a pickup 100 of the recorded information reproducing apparatus in FIG. 1 and the tracks on the recording disc 3.

FIG. 2 illustrates the beam spots irradiated onto a recording surface of the recording disc 3 by the main read beam and the two sub read beams.

As shown in FIG. 2, a main beam spot MB is formed on a track T through irradiation of the main read beam. At the same time, a sub beam spot SB1 is formed on the adjacent track (T+1) through irradiation of a first sub read beam. Further, a sub beam spot SB2 is formed on a track (T−1) adjacent to the track T through irradiation of a second sub read beam. The reflected light beams from the main beam spot MB, and the sub beam spots SB1 and SB2 are irradiated on a light detector 107 via the objective lens 106 and the half mirror 105. The light detector 107 has light detectors 107a to 107c.

The light detector 107a supplies to an A/D converter 5a a read signal that has been obtained by performing photoelectric conversion of the reflected light from the sub beam spot SB1 supplied via the half mirror 105. The light detector 107b supplies to an A/D converter 5b a read signal that has been obtained by performing photoelectric conversion of the reflected light from the main beam spot MB supplied via the half mirror 105. The light detector 107c supplies to an A/D converter 5c a read signal that has been obtained by performing photoelectric conversion of the reflected light from the sub beam spot SB2 supplied via the half mirror 105.

Here, as shown in FIG. 2, the sub beam spot SB1 is formed at a distance of $L_{AB}$ from the main beam spot MB in the read direction. In addition, the main beam spot MB is formed at a distance of $L_{BC}$ from the sub beam spot SB2.

The A/D converter 5a supplies a read sample value sequence, which has been obtained by sampling the read signal supplied from the light detector 107a, to the crosstalk elimination circuit 40 as a sub read sample value sequence SS1. The A/D converter 5b supplies a read sample value sequence, which has been obtained by sampling the read signal supplied from the light detector 107b, to a delay circuit 7. The delay circuit 7 retards the read sample value sequence supplied from the A/D converter 5b by a first delay time as follows and supplies the same to the crosstalk elimination circuit 40 as a main read sample value sequence MS.

First delay time = $L_{AB}/V$ $L_{AB}$: distance between sub beam spot SB1 and main beam spot MB V: linear reading speed of pickup 100 with respect to recording disc 3

The A/D converter 5c supplies a read sample value sequence, which has been obtained by sampling the read signal supplied from the light detector 107c, to a delay circuit 8. The delay circuit 8 retards the read sample value sequence supplied from the A/D converter 5c by a second delay time as follows and supplies the same to the crosstalk elimination circuit 40 as a sub read sample value sequence SS2.

Second delay time = $(L_{AB}+L_{BC})/V$ $L_{AB}$: distance between sub beam spot SB1 and main beam spot MB $L_{BC}$: distance between main beam spot MB and sub beam spot SB2

V: linear reading speed of pickup 100 with respect to recording disc 3

That is to say, as shown in FIG. 2, at the same time as the sub read sample value sequence SS1 read from a position $Q_1$ on track (T+1) is supplied to the crosstalk elimination circuit 40, the main read sample value sequence MS read from the position $Q_2$ on track T is supplied to the crosstalk elimination circuit 40. Further, the sub read sample value sequence SS2 read from the position $Q_3$ on track (T−1) is also supplied at the same time to the crosstalk elimination circuit 40. Here, the positions $Q_1$ to $Q_3$, as shown in FIG. 2, are located on a line in the orthogonal direction to the tracks. Accordingly, three read sample value sequences (MS, SS1, and SS2) read from the positions adjacent to each other on the three adjacent tracks are simultaneously supplied to the crosstalk elimination circuit 40.

The crosstalk elimination circuit 40 obtains a read sample value sequence P from which crosstalk components from the adjacent tracks (T+1) and (T−1) that are superimposed on the main read sample value MS have been eliminated, on the basis of the sub read sample value sequences SS1 and SS2. A binary decision circuit 9 determines the binary reproduction data on the basis of this read sample value sequence P and outputs the same.

Figure 3:
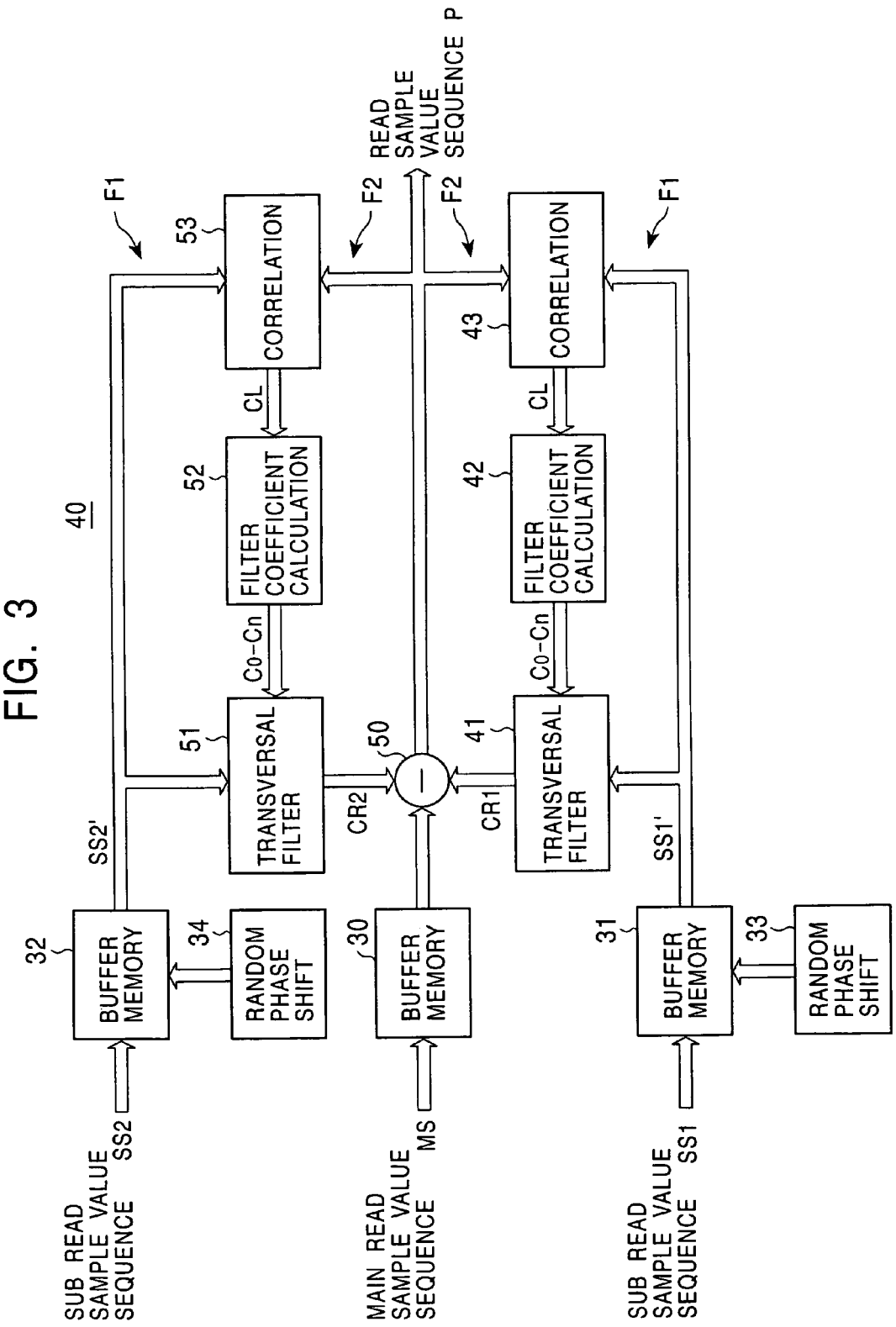
FIG. 3 is a diagram showing an example of the configuration of a crosstalk elimination circuit 40 in the recorded information reproducing apparatus in FIG. 1.

FIG. 3 is a diagram showing the internal configuration of the crosstalk elimination circuit 40.

As shown in FIG. 3, the crosstalk elimination circuit 40 comprises buffer memories 30 to 32, random phase shift control circuits 33 and 34, transversal filters 41 and 51, filter coefficient calculation circuits 42 and 52, correlation calculation circuits 43 and 53, and a subtracter 50.

In the buffer memory 30, the sample values in the main read sample value sequence MS are sequentially written, and are read out in the order in which they have been written and supplied them to the subtracter 50.

In the buffer memory 31, the sample values in the sub read sample value sequence SS1 are sequentially written, and are read out in the order in which they have been written, in accordance with a read signal supplied from the random phase shift control circuit 33. The random phase shift control circuit 33 alternately generates a read signal for reading out at a timing that leads the read timing in the buffer memory 30 by a predetermined amount of time, or a read signal for reading out at a timing that is delayed, at a random timing, and supplies it to the buffer memory 31. Thereby, the buffer memory 31 outputs a sub read sample value sequence SS1' that is shifted by a predetermined small amount of time while altering the shift direction of its phase (lead direction/delay direction) at a random timing, with respect to the main read sample value sequence MS read from the buffer memory 30. The buffer memory 31 supplies this sub read sample value sequence SS1' to the transversal filter 41 and the correlation calculation circuit 43.

In the buffer memory 32, the sample values in the sub read sample value sequence SS2 are sequentially written, and they are read in the order in which they have been written, in accordance with a read signal supplied from the random phase shift control circuit 34. The random phase shift control circuit 34 alternately generates a read signal for reading out at a timing that leads the read timing in the buffer memory 30 by a predetermined amount of time, or a read signal for reading out at a timing that is delayed, at a random timing, and supplies it to the buffer memory 32. Thereby, the buffer memory 32 outputs a sub read sample value sequence SS2' that is shifted by a predetermined small amount of time while altering the shift direction of its phase (lead direction/delay direction) at a random timing, with respect to the main read sample value sequence MS read from the buffer memory 30. The buffer memory 32 supplies this sub read sample value sequence SS2' to the transversal filter 51 and the correlation calculation circuit 53.

Figure 4:
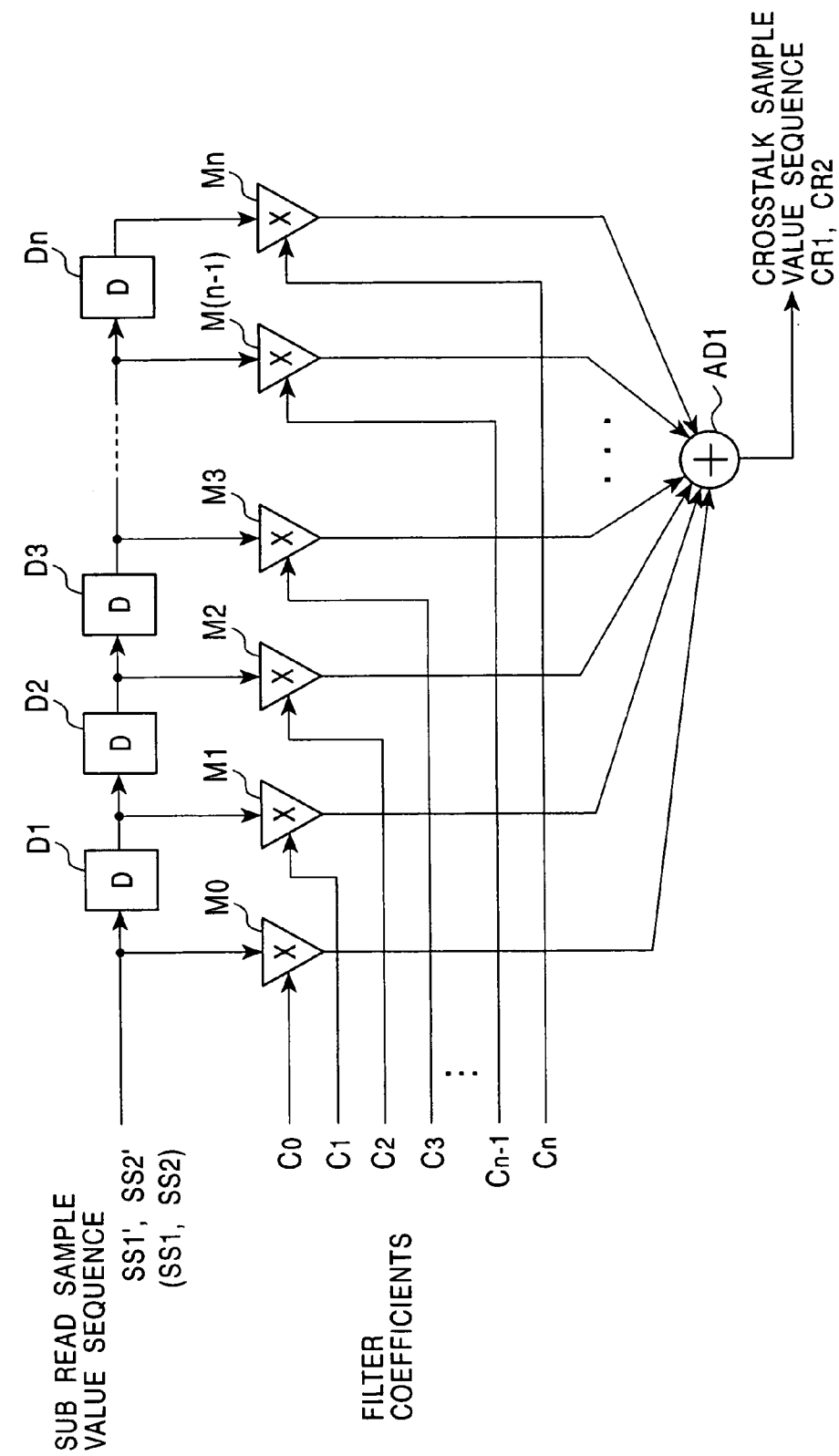
FIG. 4 is a diagram showing the internal configuration of a transversal filter 41 (51) provided in the crosstalk elimination circuit 40.

The transversal filters 41 and 51 have the configuration shown in FIG. 4 for example.

In FIG. 4, D flip-flops D1 to Dn arranged in series with n stages take the sub read sample value sequence SS1' (SS2') in while shifting it sequentially. In the coefficient multiplier M0, each sample value in the sub read sample value sequence SS1' (SS2') is multiplied with the filter coefficient $C_0$ supplied from the filter coefficient calculation circuit 42 (52). In coefficient multipliers M1 to Mn, outputs from the flip-flops D1 to Dn are respectively multiplied with the filter coefficients $C_1$ to $C_n$ supplied from the filter coefficient calculation circuit 42 (52). An adder AD1 adds the results of the multiplications in the coefficient multipliers M1 to Mn and outputs addition result as a crosstalk sample value sequence CR1 (CR2).

The transversal filter 41 having this configuration determines a crosstalk sample value sequence CR1 corresponding to the crosstalk from the adjacent track (T+1) through subjecting the sub read sample value sequence SS1' to filter processing with the filter coefficients $C_0$ to $C_n$ supplied from the filter coefficient calculation circuit 42. In addition, the transversal filter 51 determines a crosstalk sample value sequence CR2 corresponding to the crosstalk component from the adjacent track (T−1) through subjecting the sub read sample value sequence SS2' to filter processing with the filter coefficients $C_0$ to $C_n$ supplied from the filter coefficient calculation circuit 52.

The subtracter 50 obtains the read sample value sequence P in which the crosstalk has been eliminated by subtracting the crosstalk sample sequences CR1 and CR2 from the main sample value sequence MS supplied from the buffer memory 30, and supplies it to the correlation calculation circuits 43 and 53.

When there is a transition from positive to negative or from negative to positive between two consecutive sample values of the read sample value sequence P, then the correlation calculation circuits 43 extracts the sample value with the smaller absolute value of the two values, and obtains this sequence as a zero crossing sample value sequence. Further, on the basis of the result of multiplication between this zero crossing sample value sequence and the sub read sample value sequence SS1', the correlation calculation circuits 43 obtains a correlation signal CL of a sequence that consists of logic levels 0 and 1 indicating the level correlation between them, and supplies it to the filter coefficient calculation circuit 42. The filter coefficient calculation circuit 42 supplies the results of integrations of the correlation signal CL obtained at (n+1) consecutive sampling timings to the transversal filter 41 as filter coefficients $C_0$ to $C_n$ respectively.

When there is a transition from positive to negative or from negative to positive between two consecutive sample values of the read sample value sequence P, then the correlation calculation circuits 53 extracts the sample value with the smaller absolute value of the two values, and obtains this sequence as a zero crossing sample value sequence. Further, on the basis of the result of multiplication between this zero crossing sample value sequence and the sub read sample value sequence SS2', the correlation calculation circuits 53 obtains a correlation signal CL of a sequence consisting of logic levels 0 and 1 indicating the level correlation between them, and supplies it to the filter coefficient calculation circuit 52. The filter coefficient calculation circuit 52 supplies the results of integrations of the correlation signal CL obtained at (n+1) consecutive sampling timings to the transversal filter 51 as filter coefficients $C_0$ to $C_n$ respectively.

Hereinafter, the operation of the crosstalk elimination circuit 40 shown in FIG. 3 will be described with reference to FIGS. 5A, 5B and 5C, considering the case that both the main track and the sub tracks are in the recorded area, and the case that the main track is in the recorded area and a sub track is in the unrecorded area.

(1) Both the Main Track and the Sub Tracks are in the Recorded Area

Figure 5:
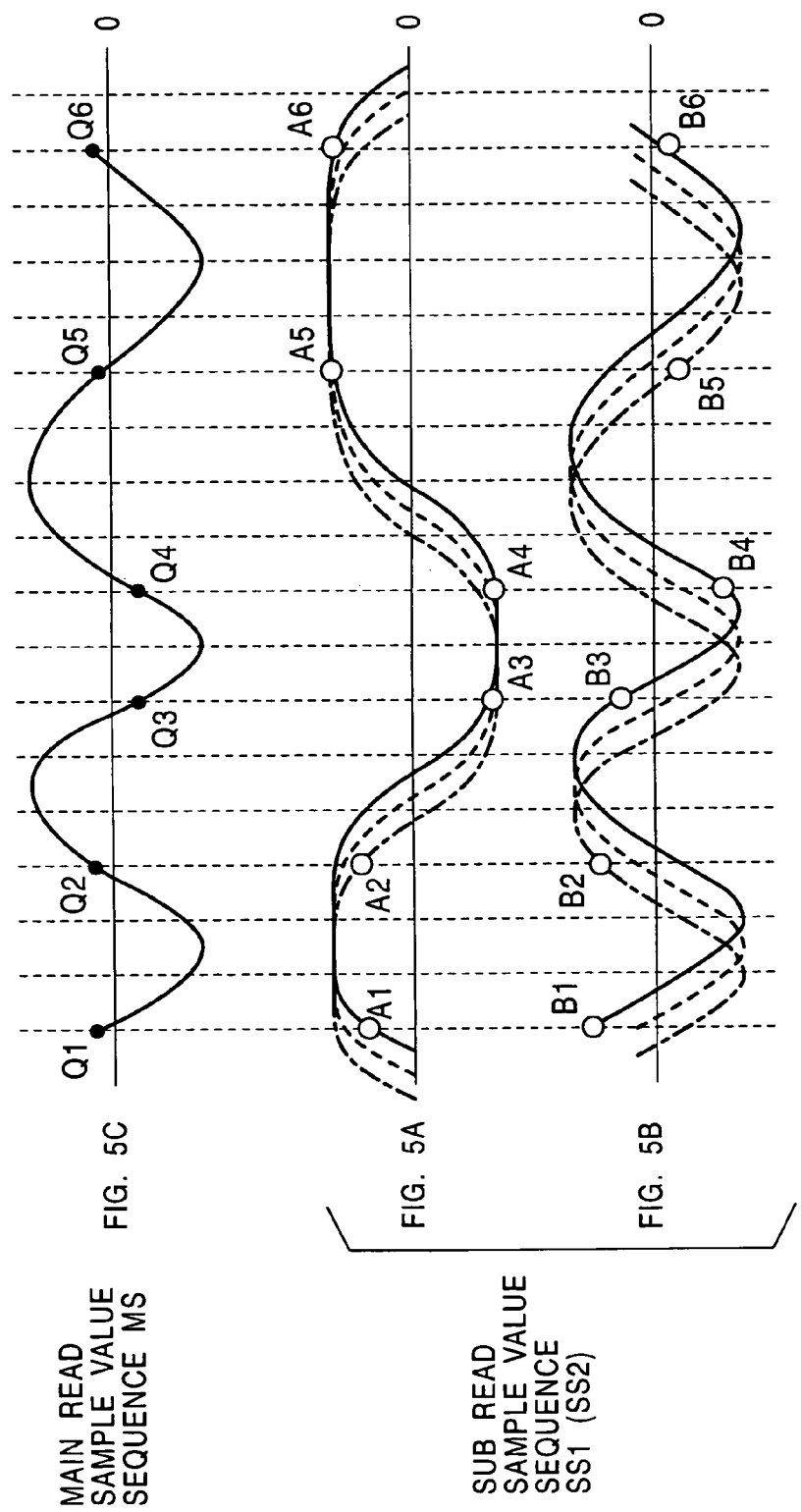
FIGS. 5A, 5B and 5C are diagrams for explaining the operation of the crosstalk elimination circuit 40 in FIG. 3.

In FIG. 5A, a solid line indicates that the sub read sample value sequence SS1 (SS2), which is indicated by a dashed line, is phase-shifted in the lead direction, whereas a dash-dotted line indicates that it is shifted in the delay direction. Here, when the zero crossing sample values in the main read sample value sequence MS are the zero crossing sample values $Q_1$ to $Q_6$ shown in FIG. 5C, it is assumed that the following phase shifts are carried out in the random phase shift control circuit 33 (34) and the buffer memory 31 (32).

At the time of zero crossing sample value $Q_1$: phase shift in lead direction

At the time of zero crossing sample value $Q_2$: phase shift in delay direction

At the time of zero crossing sample value $Q_3$: phase shift in lead direction

At the time of zero crossing sample value $Q_4$: phase shift in lead direction

At the time of zero crossing sample value $Q_5$: phase shift in delay direction

At the time of zero crossing sample value $Q_6$: phase shift in lead direction

Thus, the sample values of the sub read sample value sequence SS1' (SS2') obtained at the respective times of these zero crossing sample values $Q_1$ to $Q_6$ are the sample values $A_1$ to $A_6$ shown in FIG. 5A. Accordingly, even after tiny phase shifts are performed, the crosstalk components indicated by the zero crossing sample values $Q_1$ to $Q_6$ are reflected as the sample values $A_1$ to $A_6$ of the sub read sample value sequence SS1' (SS2'). Thus, the crosstalk components from the adjacent tracks can be obtained by correlation detection between the zero crossing sample values $Q_1$ to $Q_6$ and the sample values $A_1$ to $A_6$.

(2) The Main Track is in the Recorded Area and a Sub Track is in the Unrecorded Area In this case, when there are leaks from the main track into the sub track, the waveform of the sub read sample sequence SS1 (SS2) is, as indicated by dashed line in FIG. 5B, almost identical to that of the main read sample value sequence MS. In addition, the case that the sub read sample sequence SS1 (SS2) is phase-shifted in the lead direction is indicated by a solid line in FIG. 5B, whereas the case that the sub read sample sequence SS1 (SS2) is phase-shifted in the delay direction is indicated by a dash-dotted line in FIG. 5B. Here, at respective times of the zero crossing sample values $Q_1$ to $Q_6$ in the main read sample value sequence MS, it is assumed that the following phase shifts are carried out in the random phase shift control circuit 33 (34) and the buffer memory 31 (32).

At the time of zero crossing sample value $Q_1$: phase shift in lead direction

At the time of zero crossing sample value $Q_2$: phase shift in delay direction

At the time of zero crossing sample value $Q_3$: phase shift in lead direction

At the time of zero crossing sample value $Q_4$: phase shift in lead direction

At the time of zero crossing sample value $Q_5$: phase shift in delay direction

At the time of zero crossing sample value $Q_6$: phase shift in lead direction

Thus, the sample values in the sub read sample value sequence SS1' (SS2') obtained at the respective times of these zero crossing sample values $Q_1$ to $Q_6$ are the sample values $A_1$ to $A_6$ shown in FIG. 5B. At this time, the correlation between the sequence of zero crossing sample values $Q_1$ to $Q_6$ in the main read sample value sequence MS and the sequence of sample values $B_1$ to $B_6$ in the sub read sample value sequence SS1' (SS2') is low.

Accordingly, even if there are leaks from the main track to the sub track when the main track is in the recorded area and the sub track is in the unrecorded area, the autocorrelation due to these leaks can be set to approximately 0. Thus, erroneous crosstalk detection due to the autocorrelation can be prevented.

As described above, the crosstalk elimination circuit in FIG. 3 was devised exploiting the aspect that if the phase of the sub read sample value sequence is shifted slightly when the sub track is in the recorded area, the sample values do not significantly change, however, if the phase is slightly shifted when the sub track is in the unrecorded area, then the sample values change significantly. That is to say, when the sub track is in the unrecorded area, each sample value in the sub read sample value sequence itself is near zero, so that by slightly shifting the phase of the sub read sample value sequence, the sequence may be changed to a sequence having little correlation with the main read sample value sequence. Here, on the basis of such viewpoint, in the crosstalk elimination circuit shown in FIG. 3, the phase of the sub read sample value sequence is slightly shifted on purpose against the main read sample value sequence MS by the random phase shift circuit made of the buffer memory 31 (32) and the random phase shift control circuit 33 (34). Thus, only the portion of the autocorrelation by the influence of leaks from the main track to the sub track is eliminated.

In addition, in FIG. 3, the random phase shift circuit is made of the buffer memory 31 (32) and the random phase shift control circuit 33 (34). However, as long as the phase of the sub read sample value sequence can be shifted while altering its phase shift direction, any circuit configuration is possible. It is also possible to provide the random phase shift circuit at F2 or at F1 before the correlation calculation circuit 43 (53), as shown in FIG. 3. Furthermore, in order to carry out the phase shift on the sub read sample value sequence, it is also possible to reverse the phase shift direction at regular intervals. It is further possible to alter the amount and the direction of phase shifting at each timing of shifting.

Instead of carrying out the phase shifting on the sub read sample value sequence SS1 (SS2), it is also possible to constantly subtract the autocorrelation value due to leakage from the main track to the sub track from the correlation signal CL obtained with the correlation calculation circuit 43 (53).

Figure 6:
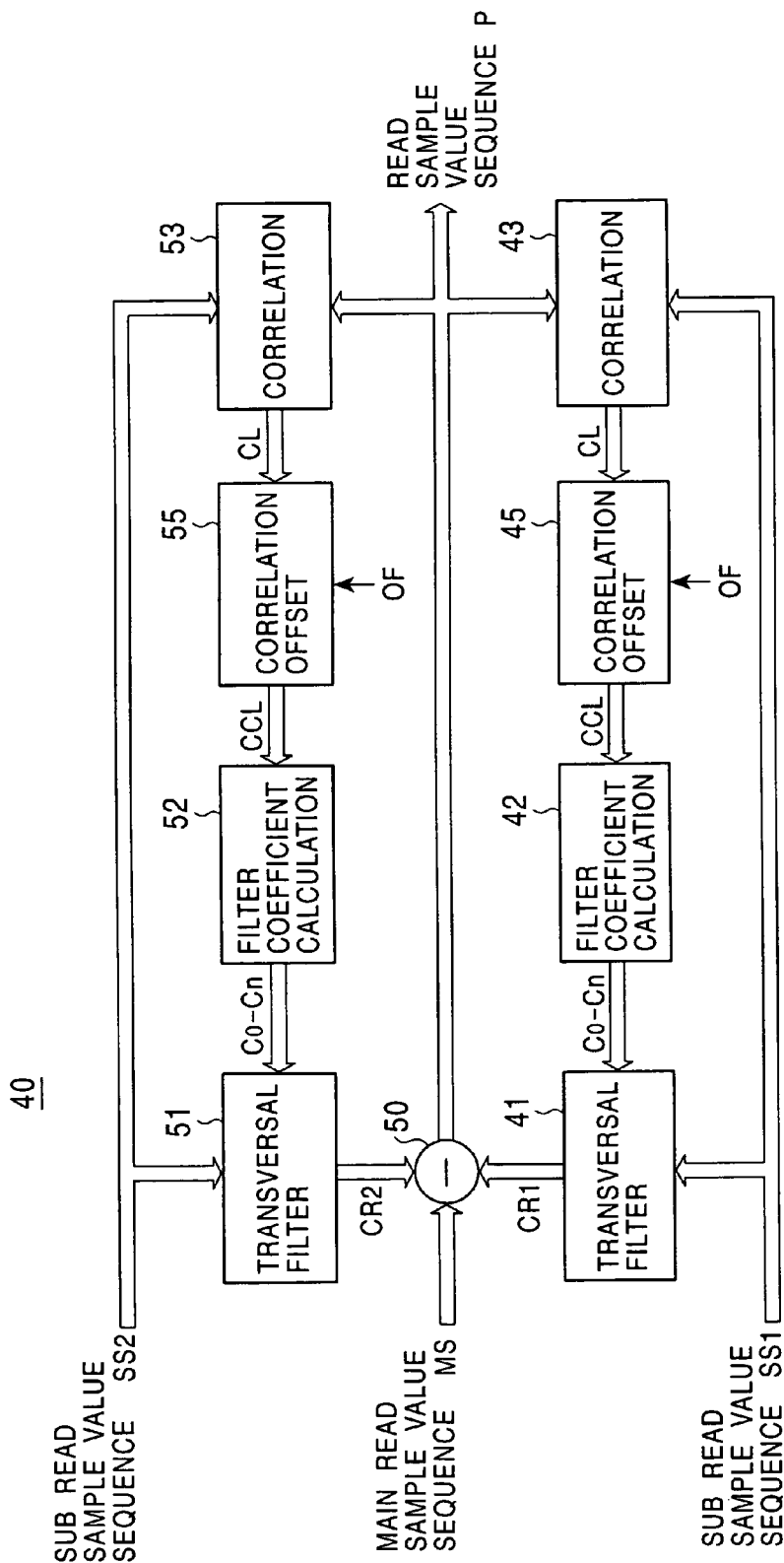
FIG. 6 is a diagram showing an example of the configuration of a crosstalk elimination circuit 40 in the recorded information reproducing apparatus in FIG. 1.

FIG. 6 is a diagram showing the configuration of a crosstalk elimination circuit 40 according to another example of the present invention devised in view of these points.

The crosstalk elimination circuit 40 shown in FIG. 6 includes transversal filters 41 and 51, filter coefficient calculation circuits 42 and 52, correlation offset circuits 45 and 55, correlation calculation circuits 43 and 53, and a subtracter 50.

The transversal filter 41 subjects the sub read sample value sequence SS1 supplied from the delay circuit 8 to filter processing with the filter coefficients $C_0$ to $C_n$ that have been supplied from the filter coefficient calculation circuits 42. Through this filter processing, the transversal filter 41 determines a crosstalk sample value sequence CR1 corresponding to crosstalk from an adjacent track (T+1). The transversal filter 51 subjects the sub read sample value sequence SS2 supplied from the A/D converter 5a to filter processing with the filter coefficients $C_0$ to $C_n$ that have been supplied from the filter coefficient calculation circuits 52. Through this filter processing, the transversal filter 51 determines a crosstalk sample value sequence CR2 corresponding to a crosstalk component from an adjacent track (T−1). Here, the transversal filters 41 and 51 include, for example, D flip flops D1 to Dn arranged in series with n stages, coefficient multipliers M0 to Mn, and an adder AD1.

The subtracter 50 obtains a read sample value sequence P in which the crosstalk has been eliminated, by subtracting the crosstalk sample value sequences CR1 and CR2 from the main sample value sequence MS, and supplies it to both the correlation calculation circuits 43 and 53.

When there is a transition from positive to negative or from negative to positive between two consecutive sample values of the read sample value sequence P, then the correlation calculation circuits 43 extracts the sample value with the smaller absolute value of the two values, and obtains this sequence as a zero crossing sample value sequence. Further, on the basis of the result of multiplication between this zero crossing sample value sequence and the sub read sample value sequence SS1, the correlation calculation circuits 43 obtains a correlation signal CL of a sequence that consists of logic levels 0 and 1 indicating the level correlation between them, and supplies it to the correlation offset circuit 45.

The correlation offset circuit 45 supplies a result obtained by subtracting the predetermined offset value OF from the correlation signal CL to the filter coefficient calculation circuit 42 as a corrective correlation signal CCL. The filter coefficient calculation circuit 42 supplies the results of integrations of the corrective correlation signal CCL obtained at (n+1) consecutive sampling timings to the transversal filter 41 as filter coefficients $C_0$ to $C_n$ respectively.

When there is a transition from positive to negative or from negative to positive between two consecutive sample values of the read sample value sequence P, then the correlation calculation circuits 53 extracts the sample value with the smaller absolute value of the two values, and obtains this sequence as a zero crossing sample value sequence. Further, on the basis of the result of multiplication between this zero crossing sample value sequence and the sub read sample value sequence SS2, the correlation calculation circuits 53 obtains a correlation signal CL of a sequence that consists of logic levels 0 and 1 indicating the level correlation between them, and supplies it to the correlation offset circuit 55.

The correlation offset circuit 55 supplies a result obtained by subtracting the predetermined offset value OF from the correlation signal CL to the filter coefficient calculation circuit 52 as a corrective correlation signal CCL. The filter coefficient calculation circuit 52 supplies the results of integrations of the corrective correlation signal CCL obtained at (n+1) consecutive sampling timings to the transversal filter 51 as filter coefficients $C_0$ to $C_n$ respectively.

Figure 7:
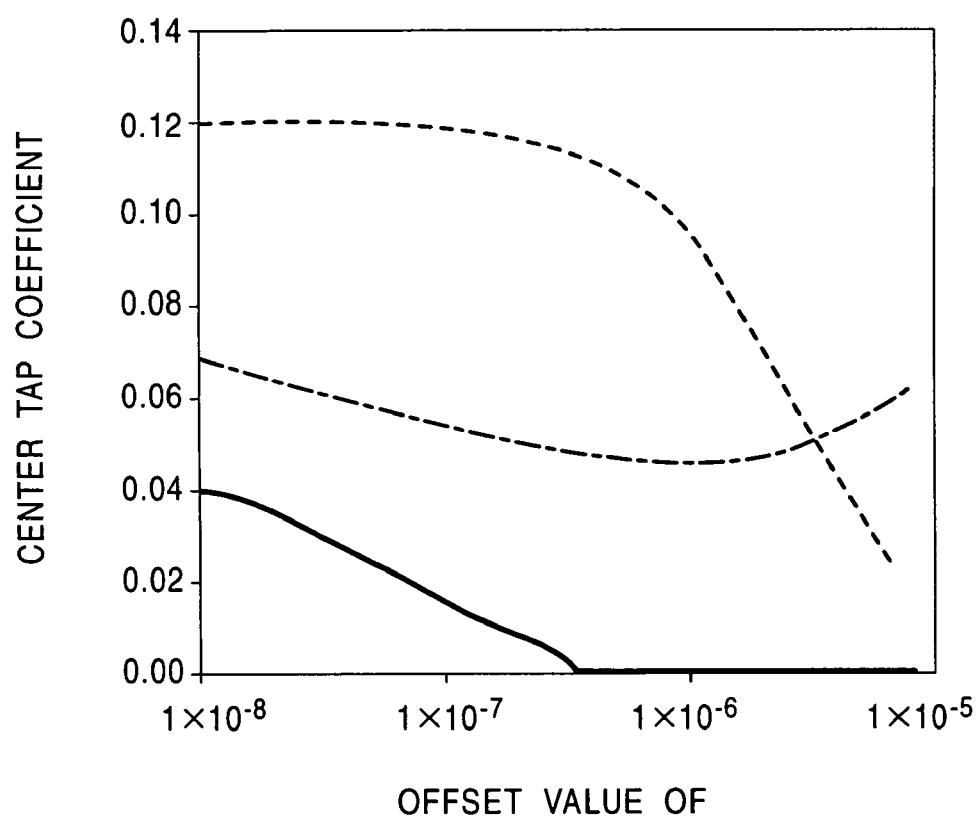
FIG. 7 is a diagram showing an example of an optimum value of an offset value OF in a correlation offset circuit 45 (55) in FIG. 6.

FIG. 7 is a diagram illustrating a correspondence between the filter coefficient $C_{(n/2)}$ obtained with the filter coefficient calculation circuits 42 and 52, that is, the center tap coefficient and the offset value OF, when each sub read beam is irradiated between the main track and the adjacent tracks. Here, NA, which is numerical aperture of the objective lens 106 mounted on the pickup 100, is 0.85 (NA=0.85), and λ, which is wavelength of the read beam, is 405 nm (k=405 nm), and the recording disc 3 is a phase change rewritable disc wherein the track pitch is 0.32 μm and the data bit length is 0.112 μm/bit. Further, it is assumed that the track adjacent to the main track on the internal circumference side of the disc is in the unrecorded area and the track adjacent on the external circumference side is in the recorded area.

The dashed line in FIG. 7 indicates the center tap coefficient that is obtained based on the sub read sample value sequence SS2 read from the area between the main track and the adjacent track in the recorded area. On the other hand, the solid line in FIG. 7 indicates a center tap coefficient that is obtained based on the sub read sample value sequence SS1 read from the area between the main track and the adjacent track in the unrecorded area. At this time, the center tap coefficient that is obtained based on the sub read sample value sequence SS1 read from the unrecorded area should actually be 0. However, when the offset value OF is smaller than $1 \times 10^{-7}$, then the center tap coefficient takes on a value other than 0 due to the influence of autocorrelation. Thus, the offset value OF is set to a value bigger than $1 \times 10^{-7}$ such that the center tap coefficient gets closer to 0. However, if the offset value OF is set too large, then jitter is increased as shown by the dash-dotted line in FIG. 7. Accordingly, it is preferable that the offset value is a value of $1 \times 10^{-7}$ to $2 \times 10^{-6}$ as shown in FIG. 7.

As described above, in the crosstalk elimination circuit 40 shown in FIG. 6, autocorrelation is eliminated by constantly subtracting the offset value OF, which corresponds to the value for the autocorrelation, from the correlation signal CL. In this case, there is a high possibility that the value of the autocorrelation is smaller than the correlation value due to the crosstalk, so that if the offset value is constantly subtracted from the correlation signal CL, there would be no negative effects on crosstalk detection.

Here, in FIG. 6, the offset value OF corresponding to the value for the autocorrelation is subtracted from the correlation signal CL. However, it is also possible to supply renewed filter coefficients $C_0$ to $C_n$ that are obtained by subtracting the value corresponding to the offset value OF from each of filter coefficients $C_0$ to $C_n$ to the transversal filter 41 (51).

Figure 8:
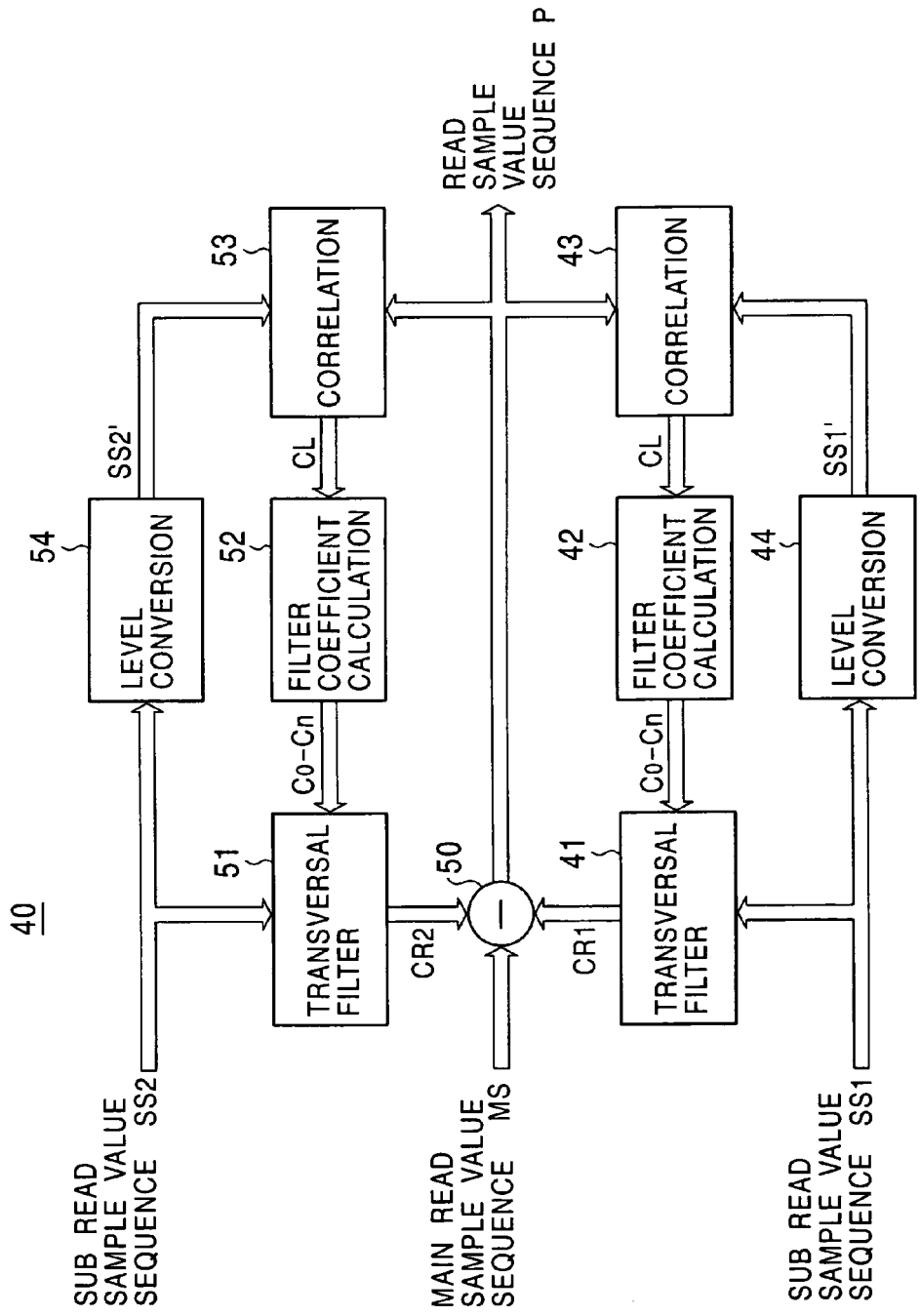
FIG. 8 is a diagram showing another example of the configuration of the crosstalk elimination circuit 40.

FIG. 8 is a diagram showing the internal configuration of the crosstalk elimination circuit 40 according to another example of the present invention.

The crosstalk elimination circuit 40 shown in FIG. 8 includes transversal filters 41 and 51, filter coefficient calculation circuits 42 and 52, correlation calculation circuits 43 and 53, level conversion circuits 44 and 54, and a subtracter 50.

The transversal filter 41 subjects the sub read sample value sequence SS1 supplied from the delay circuit 8 to filter processing with the filter coefficients $C_0$ to $C_n$ that have been supplied from the filter coefficient calculation circuits 42. Through this filter processing, the transversal filter 41 determines a crosstalk sample value sequence CR1 corresponding to crosstalk from the adjacent track (T+1). The transversal filter 51 subjects the sub read sample value sequence SS2 supplied from the A/D converter 5a to filter processing with the filter coefficients $C_0$ to $C_n$ that have been supplied from the filter coefficient calculation circuits 52. Through this filter processing, the transversal filter 51 determines a crosstalk sample value sequence CR2 corresponding to a crosstalk component from the adjacent track (T−1). Here, the transversal filters 41 and 51 include, for example, D flip-flops D1 to Dn arranged in series with n stages, coefficient multipliers M0 to Mn, and an adder AD1.

The subtracter 50 obtains the read sample value sequence P in which the crosstalk has been eliminated by subtracting the crosstalk sample value sequences CR1 and CR2 from the main sample value sequence MS, and supplies it to both correlation calculation circuits 43 and 53.

Figure 9:
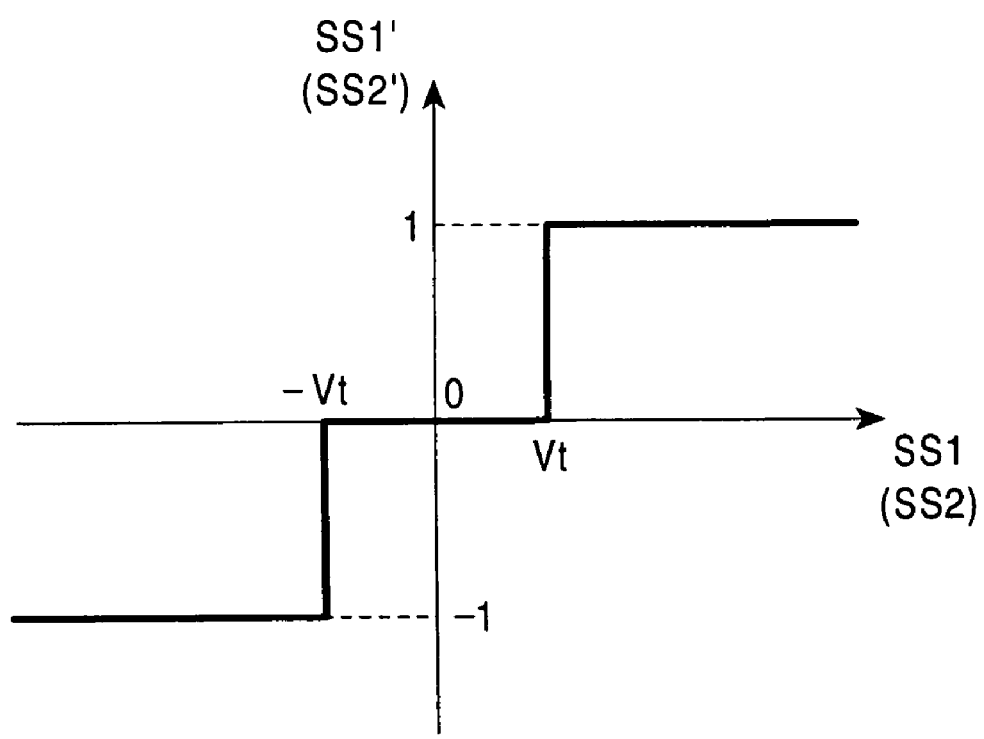
FIG. 9 is a diagram showing an example of transfer characteristic in a level conversion circuit 44 (54) provided in the crosstalk elimination circuit 40 in FIG. 8, FIGS. 10A, 10B and 10C are diagrams for explaining the operation of the crosstalk elimination circuit 40 in FIG. 8, and FIGS. 11A and 11B are diagrams showing another example of the transfer characteristic in the level conversion circuit 44 (54) provided in the crosstalk elimination circuit 40 in FIG. 8.

The level conversion circuit 44 converts, for example, each read sample value in the sub read sample value sequence SS1 according to its nonlinear characteristic as shown in FIG. 9, and supplies them to the correlation calculation circuit 43 as a sub read sample value sequence SS1'. The level conversion circuit 54 converts each read sample value in the sub read sample value sequence SS2 according to its nonlinear characteristic as shown in FIG. 9, and supplies them to the correlation calculation circuit 53 as a sub read sample value sequence SS2'. That is to say, when an absolute value of the read sample value in the sub read sample value sequence SS1 (SS2) is smaller than a predetermined value Vt, the level conversion circuit 44 (54) converts it to "0". Further, when an absolute value of the read sample value in the sub read sample value sequence SS1 (SS2) is bigger than the predetermined value Vt, the level conversion circuit 44 (54) converts it to "1", and when an absolute value of the read sample value in the sub read sample value sequence SS1 (SS2) is smaller than the predetermined value −Vt, the level conversion circuit 44 (54) converts it to "−1".

When there is a transition from positive to negative or from negative to positive between two consecutive sample values of the read sample value sequence P, then the correlation calculation circuits 43 extracts the sample value with the smaller absolute value of the two values, and obtains this sequence as a zero crossing sample value sequence. Further, on the basis of the result of multiplication between this zero crossing sample value sequence and the sub read sample value sequence SS1', the correlation calculation circuits 43 obtains a correlation signal CL of a sequence that consists of logic levels 0 and 1 indicating the level correlation between them, and supplies it to the filter coefficient calculation circuit 42. The filter coefficient calculation circuit 42 supplies the results of integrations of the correlation signal CL obtained at (n+1) consecutive sampling timings to the transversal filter 41 as filter coefficients $C_0$ to $C_n$ respectively.

When there is a transition from positive to negative or from negative to positive between two consecutive sample values of the read sample value sequence P, then the correlation calculation circuits 53 extracts the sample value with the smaller absolute value of the two values, and obtains this sequence as a zero crossing sample value sequence. Further, on the basis of the result of multiplication between this zero crossing sample value sequence and the sub read sample value sequence SS2', the correlation calculation circuits 53 obtains a correlation signal CL of a sequence that consists of logic levels 0 and 1 indicating the level correlation between them, and supplies it to the filter coefficient calculation circuit 52. The filter coefficient calculation circuit 52 supplies the results of integrations of the correlation signal CL obtained at (n+1) consecutive sampling timings to the transversal filter 51 as filter coefficients $C_0$ to $C_n$ respectively.

Next, the operation of the crosstalk elimination circuit 40 having this configuration will be described with reference to FIGS. 10A, 10B and 10C, considering the case that both the main track and the sub tracks are in the recorded area, and the case that the main track is in the recorded area and a sub track is in the unrecorded area.

(1) Both the Main Track and the Sub Tracks are in the Recorded Area

When there is a transition from positive to negative (or 0) or from negative to positive (or 0) between two consecutive sample values of the main read sample value sequence MS, the sample value with the smaller absolute value of the two values, that is, a zero cross sample value should actually be "0". However, when crosstalk occurs, the zero cross sample value of the main read sample value sequence MS as shown by black circles in FIG. 10C, which should actually be "0", is a value other than "0". More specifically, since a crosstalk component from an adjacent track is mixed into the main read sample value sequence MS, and sample values of the main read sample value sequence MS are level-shifted by the amount of the crosstalk, they will be apparent in the zero cross sample values of the main read sample value sequence MS. Here, as shown in FIG. 10A, the correlation calculation circuit 43 (53) multiplies the sample values of the sub read sample value sequence SS1' (shown by white circles) with the zero crossing sample values of the read sample value sequence P (shown by black circles in FIG. 10C), when the zero crossing sample values have been obtained, and determines the correlation value of the two. The filter coefficient calculation circuit 42 (52) gradually updates the filter coefficients $C_0$ to $C_n$ that are supplied to the transversal filter 41 (51) such that the correlation value between them becomes "0", that is, the zero crossing sample value of the read sample sequence P becomes "0". Through the feedback control by the correlation calculation circuit 43 (53), the filter coefficient calculation circuit 42 (52), the transversal filter 41 (51), and the subtracter 50, the read sample value sequence P in which the crosstalk component from the adjacent track has been eliminated is obtained.

(2) The Main Track is in the Recorded Area and a Sub Track is in the Unrecorded Area In this case, if there are leaks from the main tack to the sub track, the waveform of the sub read sample value sequence SS1 (SS2) is almost equal to that of the main read sample value sequence MS, as shown by dashed line in FIG. 10B. Accordingly, the sample values of the sub read sample value sequence SS1 (SS2) (shown by white triangles) when zero crossing sample values of the main read sample value sequence MS (shown by black circles in FIG. 10C) are obtained are almost equal to the zero crossing sample values of the main read sample value sequence MS. That is to say, in spite of the fact that the sub read sample value sequence SS1 (SS2) is read from the unrecorded area, a correlation with the main read sample value sequence MS read from the main track becomes high. Thus, in the case that the main track is in the recorded area and the sub track is in the unrecorded area, if there is leakage from the main track to the sub track, the autocorrelation is performed and the correlation, which should actually be low, becomes high.

Here, by using the sub read sample value sequence SS1' (SS2') to which the sub read sample value sequence SS1 (SS2) has been converted according to the transfer characteristic as shown in FIG. 9, the crosstalk elimination circuit shown in FIG. 8 determines a correlation with the main read sample value sequence MS. According to the transfer characteristic shown in FIG. 9, when the absolute value of the sub read sample value sequence SS1 (SS2) is small, sample values of the sub read sample value sequence SS1' (SS2') are "0" as shown by solid line in FIG. 10B. Thus, the correlation between the sample values of the sub read sample value sequence SS1' (SS2') (shown by black triangles) and the zero crossing sample values of the main read sample value sequence MS becomes low, when each zero crossing sample value of the main read sample value sequence MS (shown by black circle in FIG. 10C) is obtained.

Accordingly, even if there are leaks from the main track to the sub track when the main track is in the recorded area and the sub track is in the unrecorded area, the autocorrelation due to these leaks can be set to approximately 0. Thus, erroneous crosstalk detection due to the autocorrelation can be prevented.

Figure 11A:
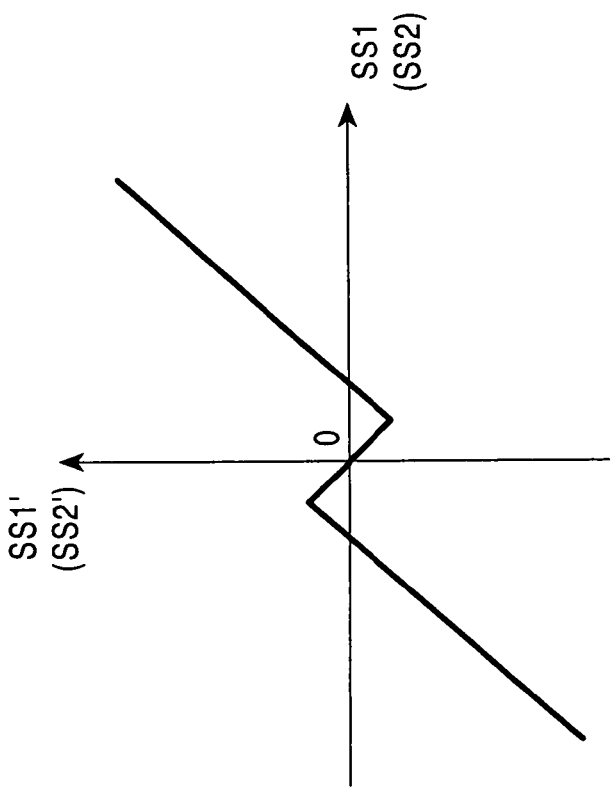
Figure 11B:
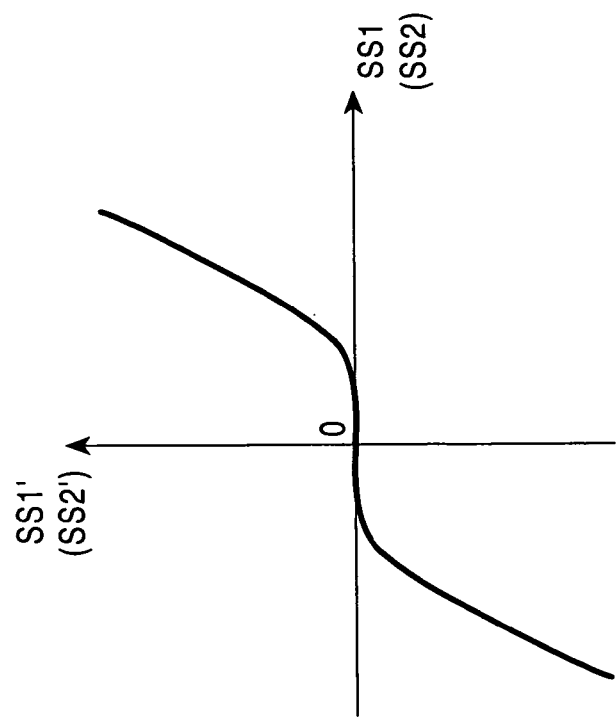

Here, the transfer characteristic of the level conversion circuit 44 (54) is not limited to the one shown in FIG. 9, and a nonlinear characteristic may be employed, for example, as shown in FIG. 11A or FIG. 11B. That is to say, as a transfer characteristic of the level conversion circuit 44 (54), when the absolute value of the sample values of the sub read sample value sequence SS1 (SS2) is small, a nonlinear characteristic that makes the correlation with the main read sample value sequence MS smaller on purpose is preferable.

In this manner, in the crosstalk elimination circuit 40 shown in FIG. 8, a correlation due to the crosstalk is detected when the absolute value of the sub read sample value sequence is comparatively big. However, regarding the autocorrelation, the function for eliminating only this autocorrelation is provided, exploiting the fact that the autocorrelation is detected when the absolute value of the sub sample value sequence is small. That is to say, when the absolute value of the sub read sample value sequence is small, this is regarded as a leakage component from the main track to the sub track, and this leakage component is lowered on purpose by the level conversion circuit 44 (54), thereby eliminating the portion of the autocorrelation.

Here, in the above examples, as shown in FIG. 2, the sub read beams are irradiated onto the tracks (T+1) and (T−1) adjacent to the main track T. However, these sub read beams may be irradiated onto a specular surface portion that is formed between the main track and the adjacent track. That is to say, it is favorable that the sub read beams are irradiated onto a position near the main track between the main track and the adjacent track. In this case, the crosstalk from the adjacent tracks can be eliminated also in the sub read sample value sequence obtained based on light that is reflected when irradiating this sub read beam light, while preventing erroneous crosstalk detection due to the autocorrelation.

In addition, the random phase shift circuit, the correlation offset circuit, and the level conversion circuit, which are provided in the crosstalk elimination circuits shown in FIG. 3, FIG. 6 and FIG. 8 respectively, may all be provided in the crosstalk elimination circuit 40. For example, when only the random phase shift circuit is provided, the effectiveness of lowering autocorrelation is high around a center tap of the transversal filter (output value from D flip-flop D (2/n)) as shown in FIG. 4, whereas it is low for the side taps. Here, a lowering of autocorrelation can be effectively realized for every tap by providing the correlation offset circuit 45 (55) shown in FIG. 6 and the level conversion circuit 44 (54) shown in FIG. 8 in the crosstalk elimination circuit shown in FIG. 3.

As described above, in the present invention, when the crosstalk is detected based on the level correlation between the main read signal read from the recording track on the recording medium and the sub read signals read from the adjacent tracks, the portion of the autocorrelation due to the influence of the leakage from this recording track to the adjacent track is eliminated.

Therefore, even if the track adjacent to the recording track that is to be read is in the unrecorded area, or the sub read beam is irradiated onto a specular surface portion between the recording track and the adjacent track, or this adjacent track moves from the unrecorded area to the recorded area, stable crosstalk elimination can be performed.

This application is based on a Japanese Patent Application No. 2002-155088 which is hereby incorporated by reference.

What is claimed is:

1. A recorded information reproducing apparatus for reproducing recorded information recorded on a recording medium, comprising:
   a main read portion for generating a main read signal based on amount of light that is reflected when irradiating main read beam light onto a recording track on said recording medium;
   a sub read portion for generating a sub read signal based on amount of light that is reflected when irradiating sub read beam light onto a position near said recording track onto which said main read beam light has been irradiated;
   a crosstalk detection portion for detecting a crosstalk component from an adjacent track that is superimposed on said main read signal, based on a level correlation between said main read signal and said sub read signal; and
   a subtraction portion for subtracting said crosstalk component from said main read signal to generate a read signal in which the crosstalk has been eliminated;
   wherein said crosstalk detection portion comprises a correlation offset portion for subtracting a predetermined offset value from said correlation value, said predetermined offset value being bigger than a value of autocorrelation due to an influence of leakage from said recording track to said adjacent track.

2. The recorded information reproducing apparatus according to claim 1, wherein said crosstalk detection portion comprises:
   a correlation calculation circuit for generating a correlation value corresponding to a correlation between said sub read signal and said main read signal;
   a filter coefficient calculation circuit for generating filter coefficients in accordance with an integration result obtained by integrating said correlation value; and
   a transversal filter for generating said crosstalk component from said adjacent track by subjecting said sub read signal to filter processing with said filter coefficients.

3. A recorded information reproducing apparatus for reproducing recorded information recorded on a recording medium, comprising:
   a main read portion for generating a main read signal based on amount of light that is reflected when irradiating main read beam light onto a recording track on said recording medium;
   a sub read portion for generating a sub read signal based on amount of light that is reflected when irradiating sub read beam light onto a position near said recording track onto which said main read beam light has been irradiated;
   a crosstalk detection portion for detecting a crosstalk component from an adjacent track that is superimposed on said main read signal, based on a level correlation between said main read signal and said sub read signal; and
   a subtraction portion for subtracting said crosstalk component from said main read signal to generate a read signal in which the crosstalk has been eliminated;
   wherein said crosstalk detection portion comprises a level conversion portion for lowering a level of said sub read signal when an absolute value of said sub read signal is smaller than a predetermined value, and said crosstalk component is detected based on a level correlation between said main read signal and said sub read signal whose level has been converted by said level conversion portion.

4. The recorded information reproducing apparatus according to claim 3, wherein said level conversion portion comprises a portion for converting a level of said sub read signal to a predetermined high level when an absolute value of said sub read signal is bigger than said predetermined value.

5. The recorded information reproducing apparatus according to claim 3, wherein said crosstalk detection portion comprises:
   a correlation calculation circuit for generating a correlation value corresponding to a level correlation between said sub read signal and said main read signal that have been subjected to level conversion processing by said level conversion portion;
   a filter coefficient calculation circuit for generating filter coefficients in accordance with an integration result obtained by integrating said correlation value; and
   a transversal filter for generating said crosstalk component from said adjacent track by subjecting said sub read signal to filter processing with said filter coefficients.

* * * * *